United States Patent [19]

Harris et al.

[11] 4,362,187
[45] Dec. 7, 1982

[54] SPIRALLY-FORMED THERMOPLASTIC TUBE

[75] Inventors: Allan Harris, Newport Beach; Lemuel H. Huff, Anaheim, both of Calif.

[73] Assignee: Manville Service Corporation, Denver, Colo.

[21] Appl. No.: 175,473

[22] Filed: Aug. 5, 1980

[51] Int. Cl.³ .............................................. F16L 9/16
[52] U.S. Cl. .................................... 138/109; 138/122; 138/154; 285/345; 285/DIG. 4; 277/207 A
[58] Field of Search ............... 138/109, 121, 122, 129, 138/150, 154, 173; 285/345, 373, DIG. 4; 277/207 A

[56] References Cited

U.S. PATENT DOCUMENTS

| | | | |
|---|---|---|---|
| 2,288,094 | 6/1942 | Karmazin | 138/154 X |
| 2,354,485 | 7/1944 | Slaughter | 138/154 X |
| 2,737,091 | 3/1956 | Robinson | 93/94 |
| 2,739,089 | 3/1956 | Hageltorn | 138/154 X |
| 2,994,104 | 8/1961 | Mittag | |
| 3,199,541 | 8/1965 | Richitelli | 138/129 |
| 3,495,628 | 2/1970 | Boender | 138/114 |
| 3,501,179 | 3/1970 | Boynton et al. | 285/DIG. 4 |
| 3,532,580 | 10/1970 | Kanao | 156/432 |
| 3,606,670 | 9/1971 | Wienand et al. | 29/450 |
| 3,635,505 | 1/1972 | Osterhagen et al. | 285/345 |
| 3,679,531 | 7/1972 | Wienand et al. | |
| 3,717,916 | 2/1973 | Wienand et al. | 29/200 B |
| 3,740,294 | 6/1973 | Wienand et al. | 156/429 |
| 3,914,147 | 10/1975 | Wienand et al. | 156/195 |
| 4,176,865 | 12/1979 | Felton et al. | 285/DIG. 4 |
| 4,209,043 | 6/1980 | Menzel | 138/154 |

Primary Examiner—James E. Bryant, III
Attorney, Agent, or Firm—Robert M. Krone; Gregory W. O'Connor

[57] ABSTRACT

A continuous tube T is formed by spirally-winding an extruded thermoplastic ribbon R having mating edges which are joined together to form a spiral seam and having at least one reinforcing rib 3 which, when in its spiral wrapped form, projects radially out from the tube. At predetermined lengths, the tube is cut and at the same time the outer surfaces of the tube on each side of the cut are shaped to facilitate handling and interconnecting of pipe section 1 thus formed. At least one end of the pipe has an annular groove 6 at a uniform distance from that end. This groove is formed by cutting a path through each of the radially extending reinforcing ribs intersecting its annular path. An elastomeric O-ring 8 engages the outer surface of the pipe and the axial movement of the O-ring is restrained by the walls of the groove formed by the radially extending reinforcing ribs. An apparatus 30 for cutting the tube at predetermined lengths into pipe sections while the tube is proceeding out of the spirally-winding operation also imparts to the outer surfaces the desired shape as well as cuts the groove for the elastomeric O-ring. This apparatus performs this cutting and shaping operation without interrupting the continuous forming of the tube from the spirally-wound thermoplastic ribbon.

11 Claims, 7 Drawing Figures

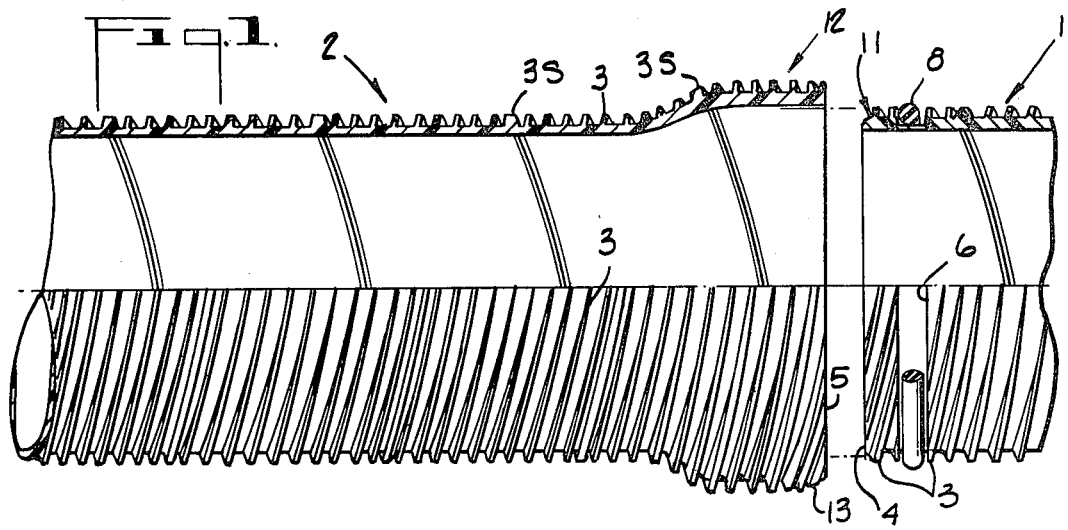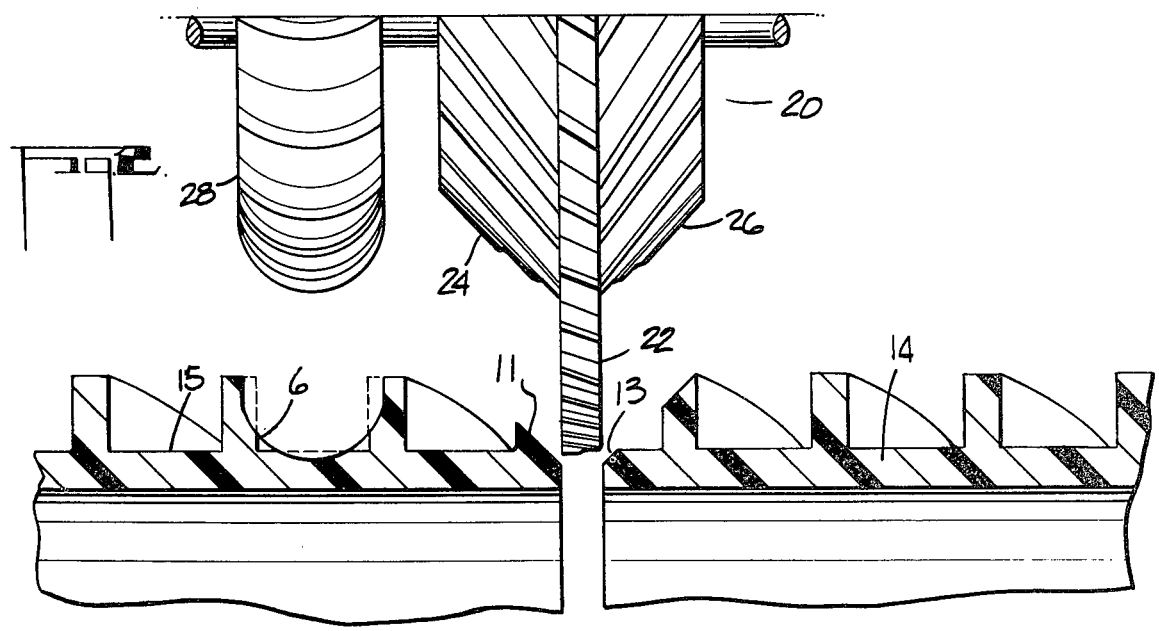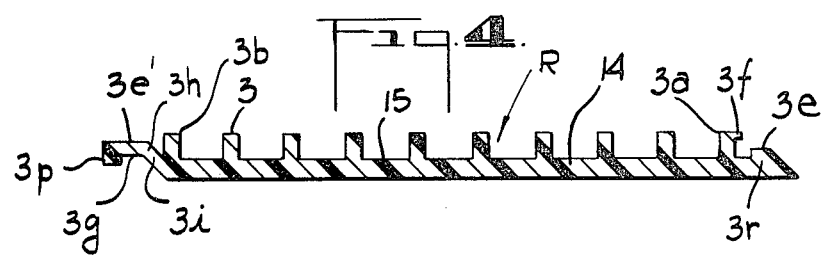

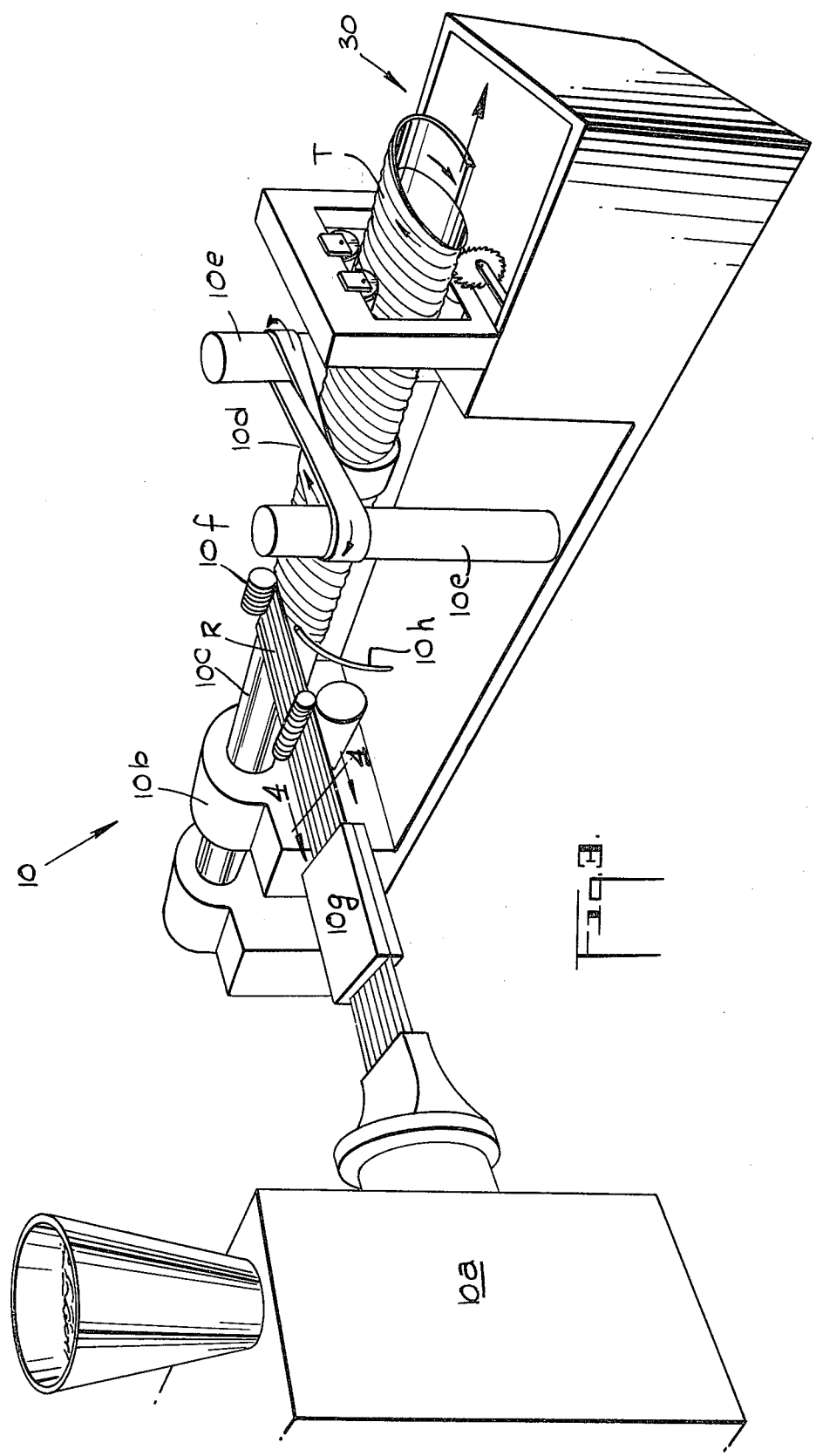

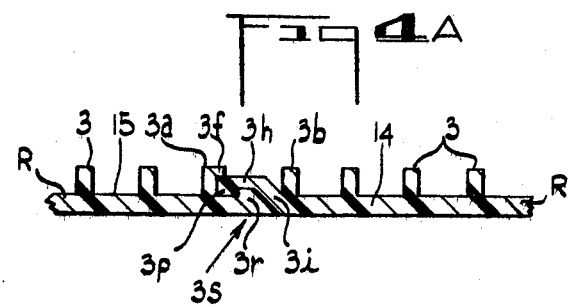

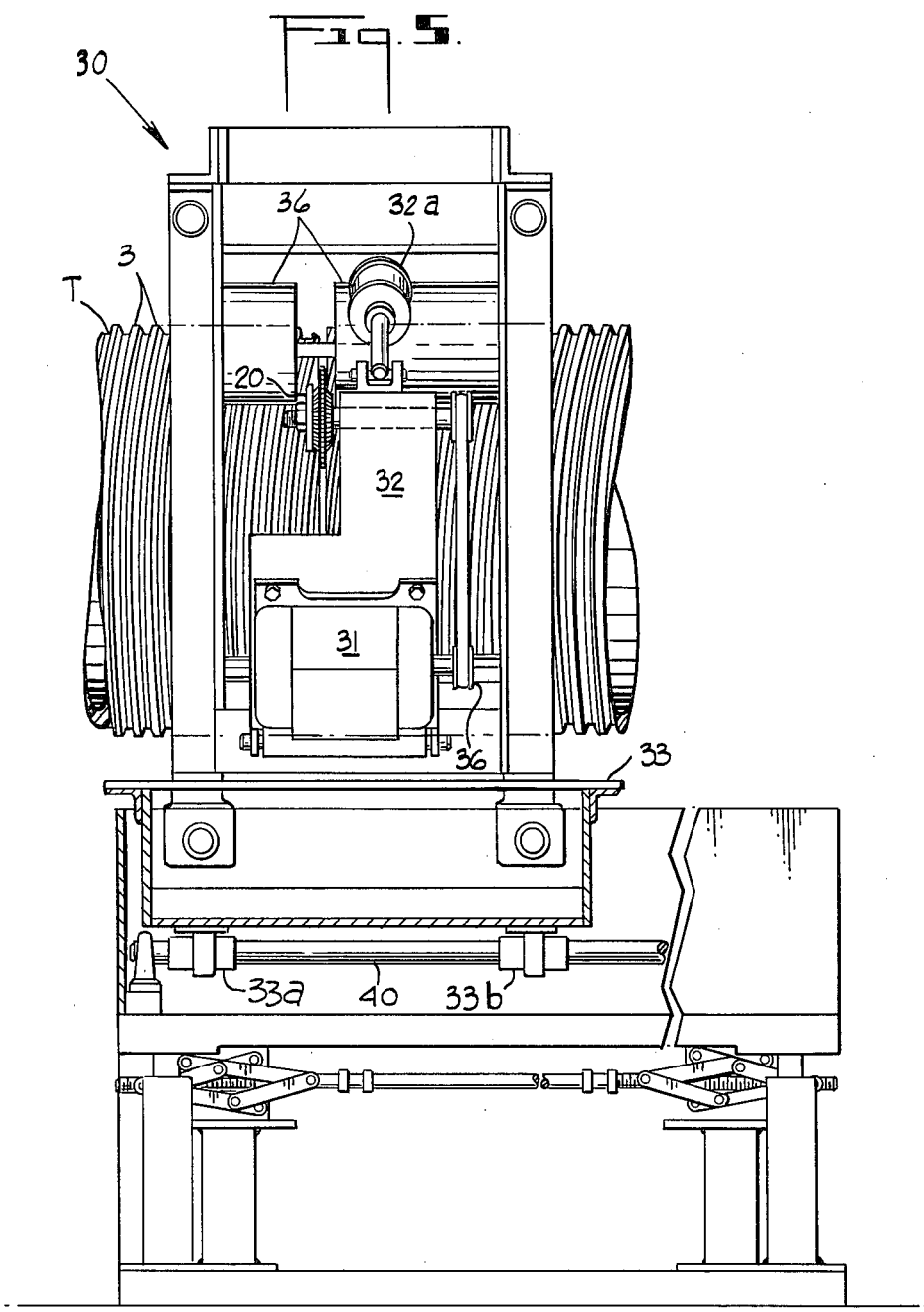

SPIRALLY-FORMED THERMOPLASTIC TUBE

TECHNICAL FIELD

The present invention relates to apparatus for simultaneously shaping the ends of lengths of pipe and severing these lengths from continuous tube being generated by a tube making machine. This tube making machine forms tube of selected diameters in virtually unlimited length by wrapping a ribbon of thermoplastic extrusion around a mandrel or series of mandrels. This extruded ribbon of thermoplastic material includes first and second edges which are abutted one against the other in a spiral in order to form a substantially imperforate pipe. These first and second edges have mating shapes to provide an interlocking function. The ribbon further includes at least one upstanding, radially extending rib which results in the spirally formed pipe having greater rigidity or resistance to crushing forces than would a pipe of uniform wall thickness based on equivalent material/unit length.

Due to the peculiar surface profile provided to the thus fabricated pipe, and due to the fact that the pipe progresses from the pipe forming machine along its longitudinal axis while simultaneously rotating about that axis, unusual problems arise concerning forming pipe sections of predetermined lengths. In order to meet reasonable production rates, the continuous tube must be cut into pipe section without interrupting the production of the tube itself. Once severed, these pipe sections require further alteration before they can be practically used in the field. The radially extending spiral-form ribs progressing along the outside of the pipe, while having great advantage in imparting strength, complicate the interfitting of the pipe section to form a useful fluid conduit.

DESCRIPTION OF PRIOR ART

There have been many examples in the prior art of attempts to utilize the benefits of forming imperforate conduit from a spirally-wound extruded strip of thermoplastic material.

U.S. Pat. No. 3,914,147 discloses a machine for continuously forming a spirally-formed tube from an extruded ribbon of thermoplastic material. FIG. 6 of this patent shows a device for severing the thus produced tube as it progresses from the disclosed pipe forming machine. This severing system includes a scanning device which apparently senses the rate of movement of tube along its longitudinal axis. This scanning device supplies an electrical signal to a servo motor which controls the traveling speed of a sawing mechanism in order to permit the sawing mechanism to cut through the cylindrical wall of the tube.

U.S. Pat. No. 3,635,505 embraces a system of connecting lengths of pipe having a spirally extending rib characteristic of spirally-wound plastic pipe. This patent advocates the use of the spirally progressing channel formed by the space between adjacent spiral ribs to contain a specially configured sealing element. In order to provide a continuous sealing abutment between the outer surface of the pipe having a spiral rib and the inner surface of a similar pipe having been belled to contain an end of a pipe of similar diameter, a notch is cut across one of the ribs at an angle to the spirally progressing channel. This permits the placement of the specially formed sealing element having a corresponding angular step. When correctly assembled, this right angled step of the sealing element passes through the notch cut through one or more of the spiral wraps of the rib.

BRIEF SUMMARY OF THE INVENTION

It is an object of this invention to provide apparatus for cutting a continuously formed tube into predetermined sections and shaping the ends of the cut sections as the continuously formed tube progresses from a machine for forming this tube from a spirally-wound ribbon of extruded plastic material.

It is another object of the invention to provide a method for severing and shaping at least one end of a pipe cut from a tube formed of a spirally-wound ribbon of extruded plastic material, this shaping taking place as the tube progresses from a tube forming machine.

It is another object of this invention to provide apparatus which precisely locates a cutting device proximate to a preselected portion of tube as it progresses from a spirally-wound plastic tube forming machine in order to permit this cutting device to sever predetermined lengths of this tube without interrupting the continuous production of tube by the tube forming machine.

It is another object of the invention to provide a pipe having its outer wall including radially extending spirally-wound ribs to reinforce the wall of the pipe, each section of the thus reinforced pipe having ends of precisely contoured form and at least one of these ends having an annular groove with discontinuous sides formed therein.

The instant invention provides a device which, without interrupting the progression of spirally-formed plastic tube of the above outlined type, simultaneously severs the thus produced tube into pipe sections of predetermined length and shapes the ends of the pipes in order to facilitate the forming of practical, generally fluid-tight connections between similar pipe sections.

More specifically, the instant invention includes means for cutting at least one path in a selected portion of the tube as it progresses from the pipe forming machine. This cutting means is moved along the axis of the pipe at a rate exactly equal to the rate of progression of the tube out of the tube forming machine. Thus the cutting means is motionless relative to the tube as it moves along its longitudinal axis. This permits the cutting means to utilize the rotational movement of the tube to make the required cuts into the wall of the tube. However, since this cutting means serves also to shape the pipe ends formed by this cutting operation, the portions of tube on both sides of the cutting means must be maintained at substantially the same position relative to one another. That is, these two sections of tube, i.e., that portion of tube progressing from the tube forming machine and that portion of tube undergoing the severing operation, must be held such that relative motion between the tube and the pipe section is substantially eliminated, at least during the cutting and shaping operation.

Clearly such relative motion is not a problem while the structure of the tube itself transmits the translation and rotational motion. This condition exists up until the moment at which the cutting means has substantially completed severing the pipe section from the tube progressing from the tube forming machine. However, since the cutting means performs more than just a severing function, the lack of relative movement between the tube and the pipe section must be maintained until the completion of all of the shaping operations of the cutting means. Hence, means, other than the selected portion of the tube itself, is provided for transmitting the rotational motion of the tube to the pipe section being shaped and severed.

The instant invention provides rollers which grip the outer circumference of the tube on both sides of the portion of the tube through which the cutting device will pass to cut at least one path in the circumference of the tube. These rollers have their axes aligned with the longitudinal axis of the tube in order to permit the tube to rotate about its longitudinal axis, but prevent relative motion along that longitudinal axis between the rollers and the tube itself. The cutting device and these rollers are interconnected in such a way that the rollers maintain this precise and constant relationship between the longitudinally progressing tube and the cutting device. The rollers also locate the outer circumference of the tube to permit the cutting means to make the necessary precise alterations to the end surfaces of the tube and the pipe section. Also, since these rollers span the severing cut made in the selected portion of the tube, they transmit the rotational motion of the tube (as it progresses from the tube forming machine) to the pipe section being severed. This permits the cutting means to continue to shape the ends of both the tube and the pipe section despite the fact that, but for the action of the gripping rollers, one of these ends would otherwise cease to rotate at the proper rate for at least a portion of this shaping operation.

BRIEF DESCRIPTION OF THE DRAWINGS

FIG. 1 is a side elevation partially in section showing the adjoining ends of two pipe sections;

FIG. 2 is a side elevation partially in section showing cutting means and the ends of the pipe section and tube which have just been cut and shaped;

FIG. 3 is a preferred spiral tube forming machine in conjunction with a preferred embodiment of the cutting and end shaping apparatus;

FIG. 4 is a cross section IV—IV of the thermoplastic ribbon as it is extruded by a portion of the tube forming machine of FIG. 3;

FIG. 4A shows the seam structure formed using the ribbon of FIG. 4;

FIGS. 5 and 6 show the cutting and end shaping apparatus in detail.

DETAILED DESCRIPTION OF THE INVENTION

Figure 6:
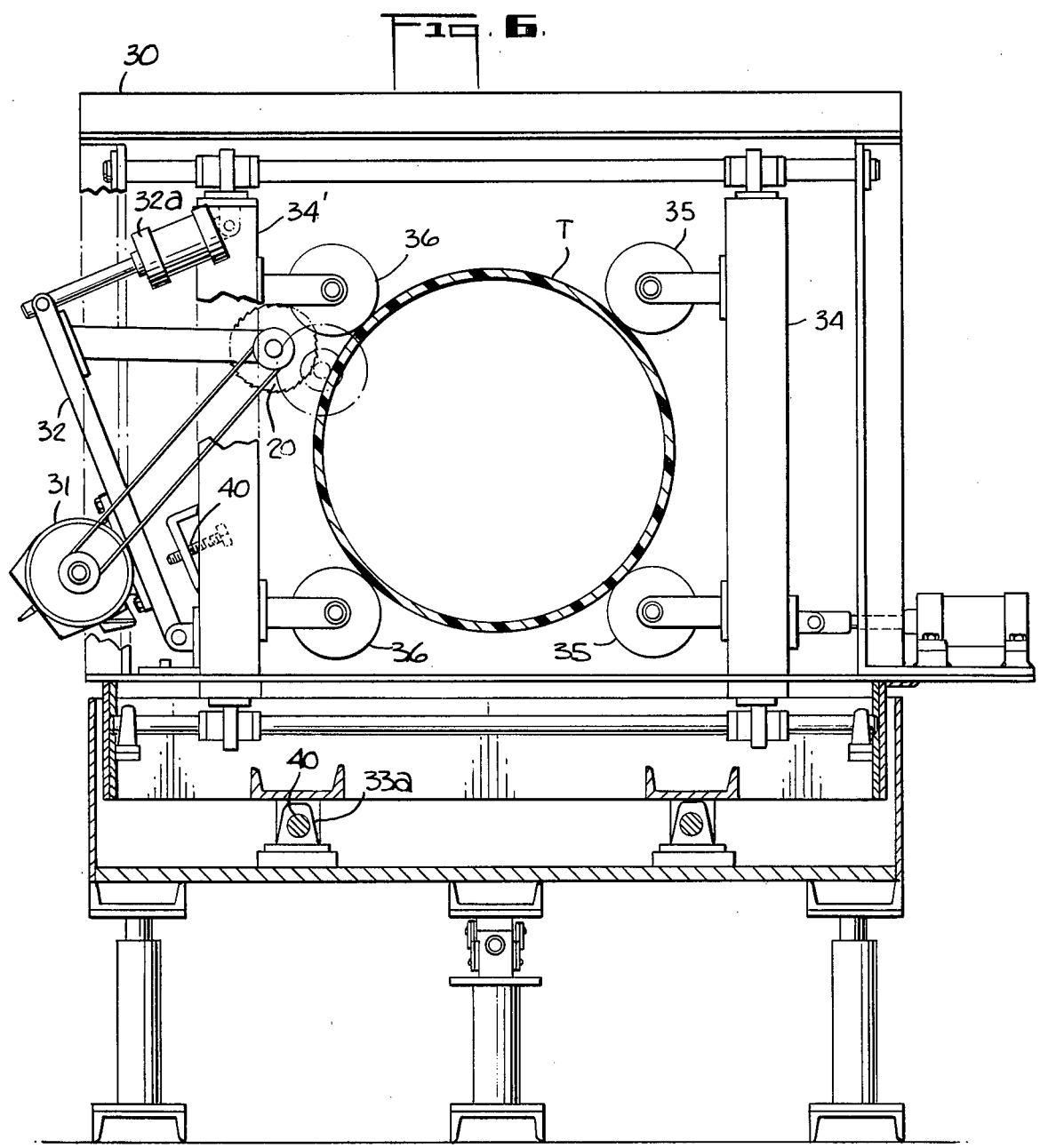

Referring to FIG. 1, the interengaging end portions of two pipe sections according to the instant invention are shown. These pipe sections include spirally progressing upstanding ribs 3 on the outer surface thereof. Pipe section 1 terminates in what is typically referred to as a spigot end and the right end of pipe section 2 has been formed into a shape typically referred to as a bell end 12. Spaced inwardly from end surface 4 of pipe section 1 is annular groove 6. When placed in operative relationship with bell end 12 of pipe section 2, annular groove 6 normally contains O-ring 8. Of course member 8 could have other configurations than that of an O-ring, since virtually any configuration can be accommodated by the instant invention. It has been found that the distance from end surface 4 to annular groove 6 should be such that there exists therebetween an adequate number of portions of upstanding ribs 3 so as to retain O-ring 8 in groove 6 during installation as well as during the operation of the pipe. This distance will be defined hereinafter.

At the end surface 4 of pipe section 1, as well as the corresponding end surface at the bell portion 12, there are specially shaped portions. Shaped portion 11 adjacent end surface 4 is a beveled or chamfered edge. This shape reduces the sharp edges generated by the cutting through of the ribs 3 at surface 4 which would otherwise project or overhang the end of the pipe. Such edges, if not removed in this manner, could constitute a hazard during handling, shipping and installation of pipe section 1. Similarly, and indeed perhaps more importantly, shaped portion 13 at the end surface 5 of bell end 12 removes the hazardous sharp edges which would otherwise intersect the end of bell end 12. Bell end 12 could include a flared out portion adjacent the shaped portion 13. If the sharp edges of the ribs in this area were not trimmed back in shaped portion 13, they would extend a considerable distance beyond the outermost circumference defined by this frusto-conical section, constituting a considerable hazard during shipping, handling and installation.

FIG. 3 shows an apparatus for making the tube from which pipe sections shown in FIG. 1 are made. Tube making machine 10 which generates a continuous length of spirally-wound plastic tube generally consists of two main portions: a thermoplastic extruder 10a and a winding device 10b. Thermoplastic extruder 10a generates a continuous ribbon of thermoplastic material having a predetermined cross-section. This predetermined cross-section is formed by an extruding die in a manner well known in the art. The thermoplastic ribbon passing through the extruding die is subsequently preferably cooled by cooling die 10g so as to place it in a plastic but generally a self-supporting condition. The ribbon passes from the extruder 10a to the winding device 10b. Device 10b of tube making machine 10 can take several forms. One example is that shown in U.S. Pat. No. 2,398,876, wherein a number of rotating spindles form the generally cylindrical wall by stretching from the inside. Another example is the device shown in U.S. Pat. No. 2,994,104, wherein the thermoplastic extrusion is shaped to its spiral form by an annular coiling member which is coaxially positioned around a single cylindrical rotating core bar. Another example of a pipe making machine is shown in previously cited U.S. Pat. No. 3,914,147.

Preferably however, winding device 10b has a single mandrel 10c with a cylindrical portion corresponding substantially to the desired interior dimension of the tubing to be formed. The mandrel 10c does not rotate to pull the ribbon R in its spiral interlocking path. This wrapping function is instead performed by endless belt 10d which is looped around the outer surface of tubing T and around drive pulleys 10e. The belt 10d is tensioned to grip tubing T, such that the looped portion both rotates the tubing T as belt 10d is pulled by drive pulleys 10e (positioned either above and below tube T, or on either side as shown) and provides tube T with longitudinal motion along its axis. This endless belt system is not per se new, and has been used for some time for making spiral wound paper cylinders as disclosed in U.S. Pat. No. 2,737,091. In this particular belt configuration, drive pulley 10e can be adjusted in a generally lateral direction. This adjustment alters the distance between drive pulleys and thus changes the size of the tube engaging loop of belt 10d. In this way, different tube diameters can be accommodated. The positions of drive pulleys 10e relative to one another along the direction of the axis of tube T can also be adjusted. This adjustment changes the pitch of the portion of belt 10d which loops around tube T. In this way, the amount tube T progresses along its longitudinal axis relative to each rotation around that axis can be altered. This permits mating edges of ribbon R to be brought together for interlocking engagement at the same position on mandrel 10c. Interlocking is brought about preferably with the aid of roller means 10f which rides on the surfaces of the ribs on either side of the mating edges to aid in guiding these edges together. The mating edges are bonded together with heat, a solvent type bonding system, or a reactive type bonding material applied via tube 10h.

FIG. 4 is a more detailed showing of the cross section IV—IV in FIG. 3. Thermoplastic extrusion R in this particular embodiment includes ten reinforcing ribs 3 including first rib 3a and last rib 3b projecting at right angles to the outwardly facing surface 15 of web 14, this web 14 being generally flat across its width and including a generally flat and smooth inwardly facing surface on the opposite side of the outwardly facing surface 15. Second mating edge 3e includes an upstanding portion 3h which permits first mating edge 3e to be received therein. This upstanding portion projects outwardly a distance substantially equivalent to ribs 3. The cross section of FIG. 4 shows that mating edge 3e includes a rib 3r projecting in the same direction (relative to the web 14) as the plurality of reinforcing ribs 3. The extreme outer edge of this mating edge 3e tapers in cross section at an oblique angle of about 45° and in a straight line from extremity of the rib 3e across the thickness of the web 14 to a sharp edge at the opposite side of the web 14. A first reinforcing rib 3a is immediately adjacent the first mating edge 3e and includes a small flange 3f at its outermost end. This small flange 3f extends along the rib 3a and protrudes laterally from one side of the 3a towards the rib 3r.

The cross section of the second mating edge 3e' shows a protrusion 3p, this protrusion 3p projects in the opposite direction of the plurality of reinforcing ribs 3 relative to the web 14. The upstanding portion 3h includes an obliquely angled portion 3i interconnecting the rest of the mating edge 3e' to the web 14 at a point adjacent the last reinforcing rib 3b. Defined between these portions 3p and 3i is a groove 3g configured to receive the rib 3r of the first mating edge 3e to form a seam structure 35 as shown in detail in FIG. 4a. Note that the protrusion 3p is sized to fit between the first rib 3a, its small flange 3f and the rib 3r when the rib 3r is received in the groove 3g. Also note that the groove 3g, the rib 3r and the protrusion 3p and the inter-connecting portion 3i are sized to project beyond the outwardly facing surface 15 of the web 14, but not beyond the flange 3f protruding from the side of the first reinforcing rib 3a. Thus, seam structure 3s (FIG. 1), defined by the mating edges when bonded together in the spiral wound configuration, constitutes a rib structure similar in radial dimension to ribs 3. The seam 3s adds to the overall strength of the tube and can be shaped and cut in a manner identical to ribs 3. Of course, extrusion R could have other configurations with different numbers and dimensions of ribs, thickness and width of web 14, etc. These parameters would depend on the diameter and strength of tubing to be formed, thermoplastic material used, and to what use the tubing would ultimately be put. The particular embodiment of ribbon R shown is used in forming a sewer pipe of eight-inch nominal diameter having solvent bonded seam 3s. It is contemplated that the disclosed invention could be equally applicable to other and more particularly larger size pipe, requiring primarily only a change of extrusion dies, winding mandrel 10c, and the position of drive pulleys 10e to permit making the larger diameter tubing.

Adjacent to pipe making machine 10 and aligned along the axis of the spirally-wound tube emanating from tube wrapping machine 10b is pipe cutting and end shaping means 30 shown in FIGS. 5 and 6. Means 30 is supported on rails 40 in order to permit 30 to move in a direction parallel to the longitudinal axis of tube T. This longitudinal movement is necessary since tube T moves at a substantially fixed rate along that longitudinal axis as the thermoplastic ribbon is wound in a spiral manner by tube winding device 10b. Means 30 includes frame member 33 rigidly attached to slide devices 33a and 33b, which slide devices in turn ride on rail members 40. Supported on frame 33 is movable carriage device 32 which in turn supports motor 31. Motor 31 rotates cutting and shaping blade 20 at relatively high speed, which blade is moved by carriage 32 from a first position alongside tube T to a second position wherein blade 20 contacts a selected portion of tube T in order to cut the desired end configuration and sever tube T into pipe sections. The particular configuration of movable carriage 32 can take several forms as best seen in FIG. 4; however, carriage 32 is pivotally attached to and moves longitudinally with frame 33. Carriage 32 pivots to place blade 20 into contact with tube T and out of such contact by operation of hydraulic motor 32a.

Operatively associated with movable frame 33 and on one side of tube T are tube engaging rollers 35. They are shown as generally cylindrical elongated rollers and, although they are not visible in FIG. 5, span either side of the portion of tube T which is intended to be cut, and indeed during operation of these rollers will be cut by a cutting device 20. Rollers 36 adjacent the side having cutting device 20 thereon also span this portion of tube T although upper roller 36 may be divided into two sections to permit the passage of cutting device 20 past the rollers and into the selected portion of tube T. Rollers 35 are mounted on movable arm 34 which is operated by hydraulic cylinder 34a to bring rollers 35 into firm engagement with the wall of tube T. Hydraulic motor 34a is operated to move arm 34 to thus engage rollers 35 when it is desired that these rollers grippingly engage the outer surface of tube T defined by the ends of spirally positioned ribs 3. Rollers 35 and 36 are mounted for vertical adjustment along their respective movable arms to accommodate tubes of different diameters and to precisely hold the tube along the axis of mandrel 10c. In this particular embodiment the rollers may be adjusted to accommodate tubes from 8" to 36" in diameter. A tube having a diameter of about 24" is shown in FIGS. 5 and 6.

Rollers 35 and 36 could take a number of forms. It is desired however, that each roller should have a surface treatment which would grip the outside surface of tube T firmly and prevent any relative longitudinal motion therebetween. This surface treatment may include an elastomeric material such as rubber or synthetic plastic having a high coefficient of friction. Alternatively, these rollers may have a material providing a high surface texture such as abrasive particles or machined grooves and splines to grip firmly without slipping the outer ends of spirally-progressing ribs and mating edges which define the outermost circumference of tube T. Thus by selecting the proper engaging pressure provided by hydraulic motor 34a, rollers 35 and 36 prevent relative longitudinal motion between apparatus 30 and tube T, while permitting tube T to rotate relative to apparatus 30 about its longitudinal axis.

So it can be seen that if rollers 35 and 36 engage tube T as outlined above, apparatus 30 will accompany tube T in its longitudinal progress away from tube making machine 10 along the direction of rails 40. In this operative condition, cutting means 20 is rotated by motor 31 and is moved from its first position alongside tube T to a second position wherein it cuts the preselected portion of tube T thus forming the terminal edges of two pipes and providing a precisely defined annular groove as outlined supra. This is done by operating hydraulic motor 32a to permit frame 32 to move towards tube T, bringing cutting device 20 into operative engagement.

Cutting device 20 together with motor 31 and frame 32 remain in the second operative position as outlined above for at least one revolution of tube T as it progresses from tube making machine 10. This permits cutting device 20 to make one uniform cut through the preselected portion of the wall of tube T. It is in this condition that tube engaging rollers 35, etc., permit the proper completion of this cut. As can be seen from FIGS. 5 and 6, and in more detail in FIG. 2, cutting device 20 consists of a number of cutting blades. Saw blade 22, of a known type, has a fairly large diameter to assure complete severing of a pipe from the spirally-wound tube. Frusto-conical chamfering blades 24 and 26, however, are substantially smaller radius blades, since their function is to remove the projecting sharp edges resulting from the passage of blade 22 through upstanding ribs 3. On one side of the cut-off blade 22 and frusto-conical chamfer blades 24 and 26, there is positioned at a predetermined spaced distance a groove cutting blade 28. This blade is also of a radius smaller than saw blade 22 since it is intended only to remove material of the tube wall down to tube wall surface 15 (that is, only through upstanding ribs 3). In a preferred embodiment, blade 28 has an outside diameter of about 6.5", chamfer blades have cutting surfaces with an outside diameter of about 6.5" adjacent blade 22, cut-off blade 22 in contrast has an outside diameter of about 8". So it can be seen that as blade 22 severs the pipe from tube T, that pipe will, at some time before tube T completes a complete 360° rotation, be substantially free (i.e., mechanically disconnected) from tube T. Thus left to its own devices, the just severed pipe would cease to rotate resulting in incomplete shaping of the end of the pipe. However, rollers 35 and 36 span the preselected portion to be cut, and because of their non-slipping engagement with end portions of both tube T and the thus just separated pipe, cause this pipe to continue to rotate at precisely the same rate as tube T as it progresses from tube making machine 10. Stated another way, rollers 35, etc., transmit the rotational motion of tube T to the severed pipe section during the end cutting operation of blade 20 and the shaping operation of blades 24, 26 and 28.

FIG. 2 shows a typical portion of the spirally-wound tube in cross-section after cutting device 20 has completed its severing and shaping function and is in the process of withdrawing to its first position adjacent the longitudinally moving tube. Shaped surfaces 11 and 13 adjacent the end surfaces generated by the passage of saw blade 22 result in a pipe structure which requires no further machining; needing only that a bell section 2 be provided by known thermo-deforming methods. Groove 6 extends through the intersecting ribs 3 and down to surface 15. It is important that groove cutting blade 28 remove all the ribs 3 in this area down to surface 15 in order to provide a smooth uninterrupted annular seating surface for elastomeric O-ring 8. Since minor variations of wall thickness and circularity of tube T at groove 6 may result in incomplete removal of fins 3 at the bottom of groove 6, it is advisable to position groove cutting blade 28 such that a very small but insignificant portion of web 14 at surface 15 is removed in order to assure this smooth uninterrupted annular seating surface. This precise positioning of groove cutting blade 28 is accomplished by adjustable stop means 40 which is fixedly attached to movable carriage 34 and selectively engages carriage 32 as shown in FIG. 6. The stop device 40 can be adjusted for a particular diameter of tube T. Once this is done the excursion of movable carriage 32 can be precisely controlled to in turn control the depth of groove 6 to obtain the desired O-ring seating surface as outlined supra. This precise control is accomplished since stop means 40 engages carriage 32, stopping its movements towards tube T at the proper position.

The shape of groove 6, which is of course dictated in turn by the shape of blade 28, is preferably of hemicircular cross-section as shown in FIGS. 1 and 2. This shape generally conforms to the contour of the O-ring 8, thus limiting the displacement of O-ring 8 from its preferred sealing relationship. This shape has further benefit in that it retains the maximum amount of ribs 3 in region of the groove 6. This is desirable since a great portion of the strength of the pipe is derived from the ribs 3. Of course, other shapes could be used in forming groove 6. For example, the groove could have a square or rectangular cross section. This shape would provide a broader uninterrupted annular sealing surface on which a sealing gasket such as O-ring 8 could contact.

It should be understood that the sealing gasket could have other configurations than that of the classic O-ring. Other annular gaskets, for example having rectangular or flanged cross sections, may be more desirable, particularly where assembly effort and other factors are of major concern.

Quite clearly, groove 6 should be spaced a selected distance from end surface 4. This is so since it is desired that O-ring 8 have at least some portion of ribs 3 on both sides thereof to prevent mechanical displacement of the O-ring 8 from groove 6. A sample pipe made in accordance with Applicants' invention has an inside diameter of 8". Web 15 has a thickness of about 0.125". Ribs 3 project about 0.200" above the outer surface of the web and form an angle of about 10° to the groove 6, which is spaced about 0.375" from end surface 4. The groove itself is about 0.400" wide and extends about 0.025 inches into the outer surface of web 15.

As pointed out supra, the edges of the ribbon R are formed so that their mating surfaces form spirally extending seam 3s similar in shape to ribs 3. This is desirable since such a seam would contribute not only the structural strength in the same manner as ribs 3, but would also contribute to forming the O-ring retaining flange formed by the ribs 3 between groove 6 and end 4.

It should be understood that Applicant's invention is not limited to the particular dimension as set forth above or to the particular configuration of spiral wound pipe as shown in the drawings. Nor is Applicant's invention limited to the particular configuration of the cutting means 20 and the resulting shaped and grooved portions generated by the cutter 20 as the pipe rotates. It may be desirable, for example, to provide a grooved cutting blade such as blade 28 on both sides of the saw blade 22 in order to provide a sealing ring groove adjacent both of the resulting pipe ends. Alternatively, it may be desirable to eliminate the ring groove 6 entirely from both of the generated ends. In both of these cases, it is essential that the portion of the tube T which is being severed to form a length of pipe be held by rollers 35 and 36 relative to the rotating and translating tube T in order to permit the cutting apparatus positioned on arm 32 to complete its cutting and shaping operation.

We claim:

1. A pipe section formed of a spirally wound thermoplastic ribbon, said ribbon including first and second mating edges having mating shapes which, when joined together in spiral fashion form a substantially imperforate seam structure, and between said first and second mating edges, said ribbon includes a web which is generally flat in cross section and extends between said mating edges, and at least one upstanding reinforcing rib extending parallel to said first and second mating edges and projecting outward a substantial distance from the outwardly facing surface of said web, said pipe section further includes a first end and a second end, an annular groove spaced a uniform distance from said first end and extending entirely around said pipe section, said annular groove extending from the outer circumference of said pipe as defined by said at least one rib to a radially inward distance defined by said outwardly facing surface of said web, said uniform distance being such that said at least one rib in combination with said seam structure forms a flange between said annular groove and said first end, said flange extending completely around said pipe section.

2. A pipe section as defined in claim 1 wherein said annular groove is so configured as to form a seat for an elastomeric sealing gasket.

3. A pipe section as defined in claim 2 further including a sealing gasket, said sealing gasket having a thickness so as to extend in a radially outward direction beyond said at least one rib.

4. A pipe section as defined in claim 1 further including a bell shaped portion proximate to said second end of said pipe.

5. A pipe section as defined in claim 1 wherein said ribbon has a plurality of said ribs extending from said outwardly facing surface between said first and second edges, said first edge having a rib projecting therefrom in the same direction as said plurality of ribs, and said second edge having a groove configured to receive said rib of said first edge, said rib and said groove of said mating edges being dimensioned so that said seam structure projects a radial distance outward substantially equivalent to the radial distance defined by said plurality of ribs.

6. A pipe section as defined in claim 5 wherein said uniform distance is such that said plurality of ribs, in combination with said seam structure, form a flange between said annular groove and said first end.

7. A pipe section formed of a spirally wound thermoplastic ribbon, said ribbon including first and second mating edges having mating shapes which, when joined together in spiral fashion form a substantially imperforate seam, said ribbon further including a web extending between said first and second mating edges, said web being generally flat in cross section and having a generally smooth inwardly facing surface, said ribbon further including at least one reinforcing rib extending parallel to said first and second mating edges and projecting outwardly a substantial distance from an outwardly facing surface of said web, said first mating edge including a rib projecting in the same direction as said at least one reinforcing rib, said rib of said first mating edge tapering in an oblique angle from its extremity, across the thickness of the web (14) to a relatively sharp edge approximate said inwardly facing surface of said web, said at least one reinforcing rib being adjacent said first mating edge and including a flange extending along and protruding laterally out from one side thereof towards said rib of said first edge, said second mating edge including a protrusion which projects in the opposite direction of said at least one reinforcing rib, an upstanding portion which includes a portion inter-connecting the rest of said second mating edge to said web, and a groove defined between said protrusion and said inter-connecting portion of said second mating edge, said groove being configured to receive said rib of said first mating edge, said protrusion being sized to fit between said at least one reinforcing rib, said flange and said rib of said first edge, and said groove, said rib of said first mating edge, said protrusion and said interconnecting portion being sized to project beyond said outwardly facing surface of said web, but not beyond said flange of said at least one reinforcing rib.

8. A pipe section as set forth in claim 7 wherein said rib of said first edge tapers in a straight line from its extremity to said relatively sharp edge adjacent said opposite surface of said web.

9. A pipe section as set forth in claim 7 includes a plurality of reinforcing ribs are spaced generally uniformly across said web and project from only said outwardly facing surface thereof.

10. A pipe section as set forth in claim 9 including a first end, said first end having an annular groove spaced a uniform distance from said first end and approximate thereto, said annular groove extending from the outer circumference of said pipe as defined by said plurality of reinforcing ribs, to a radially inward distance defined by said outwardly facing surface of said web.

11. A pipe section as set forth in claim 10 wherein said groove is hemicircular in cross section and wherein said uniform distance is such that said at least one reinforcing rib in combination with said seam, form a flange between said annular groove and said first end, said flange extending completely around said pipe section.

* * * * *